United States Patent [19]

Dummermuth

[11] Patent Number: 5,569,119

[45] Date of Patent: Oct. 29, 1996

[54] IMPLEMENT FOR GROUND TREATMENT WITH A DEAD-MAN SAFETY

[75] Inventor: Paul Dummermuth, Zunzgen, Switzerland

[73] Assignee: Pamag AG, Switzerland

[21] Appl. No.: 495,153

[22] Filed: Jun. 27, 1995

[30] Foreign Application Priority Data

Jun. 27, 1994 [CH] Switzerland .................. 02037/94

[51] Int. Cl.⁶ .................. B60K 41/20; E01C 19/00
[52] U.S. Cl. .................. 477/204; 172/43; 188/84; 192/129 R
[58] Field of Search .................. 477/204, 182; 188/84; 404/133.1, 133.05; 172/358, 359, 42, 43; 192/129 R

[56] References Cited

U.S. PATENT DOCUMENTS

| | | | |
|---|---|---|---|
| 2,730,028 | 1/1956 | Oswalt | 404/133.1 X |
| 2,894,435 | 7/1959 | Brown | 404/133.1 X |
| 4,840,388 | 6/1989 | Doughty | 280/33.994 |
| 5,119,880 | 6/1992 | Zehrung et al. | 172/22 |
| 5,236,279 | 8/1993 | Grinager | 404/133.05 |

*Primary Examiner*—Rodney H. Bonck
*Attorney, Agent, or Firm*—Speckman, Pauley & Fejer

[57] ABSTRACT

A manually displaceable implement for ground treatment comprising a dead-man safety based on an automatic lowering and blocking of the running wheels (5). A stop (10) is provided on the implement for blockage, against which at least one lowered running wheel (5) rests. The automatic lowering of the running wheels (5) is accomplished by a two-part height adjustment rod (4), which is maintained together by an emergency release element (12). In an emergency, this emergency element (12) is activated by a ripcord, whereby the connection is automatically released.

18 Claims, 3 Drawing Sheets

IMPLEMENT FOR GROUND TREATMENT WITH A DEAD-MAN SAFETY

BACKGROUND OF THE INVENTION

1. Field of the Invention

This invention relates to a manually displaceable implement for ground treatment, comprising a housing, a motor-driven rotor drum rotatably seated in the housing, a connecting piece, and running wheels which are height-adjustable by a spring-loaded height adjustment rod, wherein the running wheels are lowered into a lower end position which is almost free of spring tension and the rotor drum is almost completely lifted off the ground to be treated. This invention is particularly suitable for a ground cutting machine.

2. Description of Prior Art

Implements for ground treatment are employed for cleaning, roughening or cutting of concrete, asphalt or metal surfaces. In general, they have a cage-like, motor-driven rotor drum as a treatment tool, and cage shafts on which several freely rotating beater disks are disposed. The rotor drum is disposed in such a way that the rotating beater disks cut down the surface of the ground to be treated. The setting of the treatment depth is performed by displacing the relative rotor drum shaft in respect to the surface of the ground. Generally this setting is performed by means of height-adjustable running wheels. The forward motion is manually generated by the person operating the implement.

With some embodiments of known implements for ground treatment, the height-adjustable wheels are lowered or raised during non-use. As a result, the rotor drum is either raised and the implement rests on the ground only on its wheels, or the rotor drum is lowered after its drive motor has been turned off and the implement rests only on the rotor drum.

However, in an operational state, all implements for ground treatment have the tendency to run away because of the direction of rotation of the rotor drum. If the operator releases the implement for ground treatment, it makes uncontrollable movements. This is particularly dangerous if the operator releases the implement for ground treatment unexpectedly and involuntarily, for example when feeling sick, when not paying attention or in case of an operating accident.

SUMMARY OF THE INVENTION

It is therefore an object of this invention to provide an implement for ground treatment comprising a simple dead-man safety.

This and other objects of this invention are attained by an implement for ground treatment comprising a housing, a motor-driven rotor drum rotatably seated in the housing, a connecting piece, and running wheels which are height adjustable by means of a spring-loaded height adjustment rod. When the spring is substantially free of tension, the running wheels are lowered into a lower-end position and the rotor drum is substantially completely lifted off the ground. The height-adjustment rod comprises a lower spring-loaded part which is releasably connected by an emergency release element to an upper part of the height adjustment rod. The connection is automatically releasable in an emergency. Blocking means for blocking at least one lowered running wheel is provided on the housing whereby the running wheels are lowered to the lower end position and at least one of them is blocked when the connection is released.

The implement for ground treatment in accordance with this invention comprises a dead-man safety which is simple to implement, and which can be retrofitted to existing machines. Retrofitting can be accomplished merely by replacing the height adjustment rod of the running wheels and disposing a blocking means on the housing.

The implement for ground treatment provides blocking of the running wheels in the lowered state. In the simplest form, the blocking means comprises a stop against which at least one of the running wheels rests and in this way is blocked. In accordance with another embodiment of this invention, the blocking means comprises a brake which is automatically pressed against a wheel in the lower end position of the running wheels.

This lowering and blocking of the wheels can, on the one hand, be purposely set by the user to secure the implement for ground treatment in a non-operating state. On the other hand, it is also used as the dead-man safety. In the process, the running wheels are automatically lowered and blocked. This automatic operation is achieved by dividing the height adjustment rod into two parts. The two parts are connected by an emergency release element, which is activated in case of emergency, for example, by a ripcord. In an emergency, the connection is released and the lower part of the rod moves downward by its own weight and because of the force of a spring acting on the height adjustment rod, the running wheels are lowered and blocked.

In a preferred embodiment of this invention, the height adjustment rod is connected by an emergency release element which is hook-shaped. As a consequence, not only is a simple emergency disengagement of the rod possible, but also the two parts can simply be fastened to each other again, so that the implement for ground treatment is again ready for use.

In accordance with another preferred embodiment, a switch element for the drive motor of the rotor drum is provided in addition to the automatic lowering and blocking of the running wheels. It is operatively connected to the coupling of the height adjustment rod such that, if the rod is separated, the drive motor is also switched off.

BRIEF DESCRIPTION OF THE DRAWINGS

These and other objects and features will be better understood from the following detailed description taken in conjunction with the drawings wherein.

DESCRIPTION OF PREFERRED EMBODIMENTS

Figure 1:
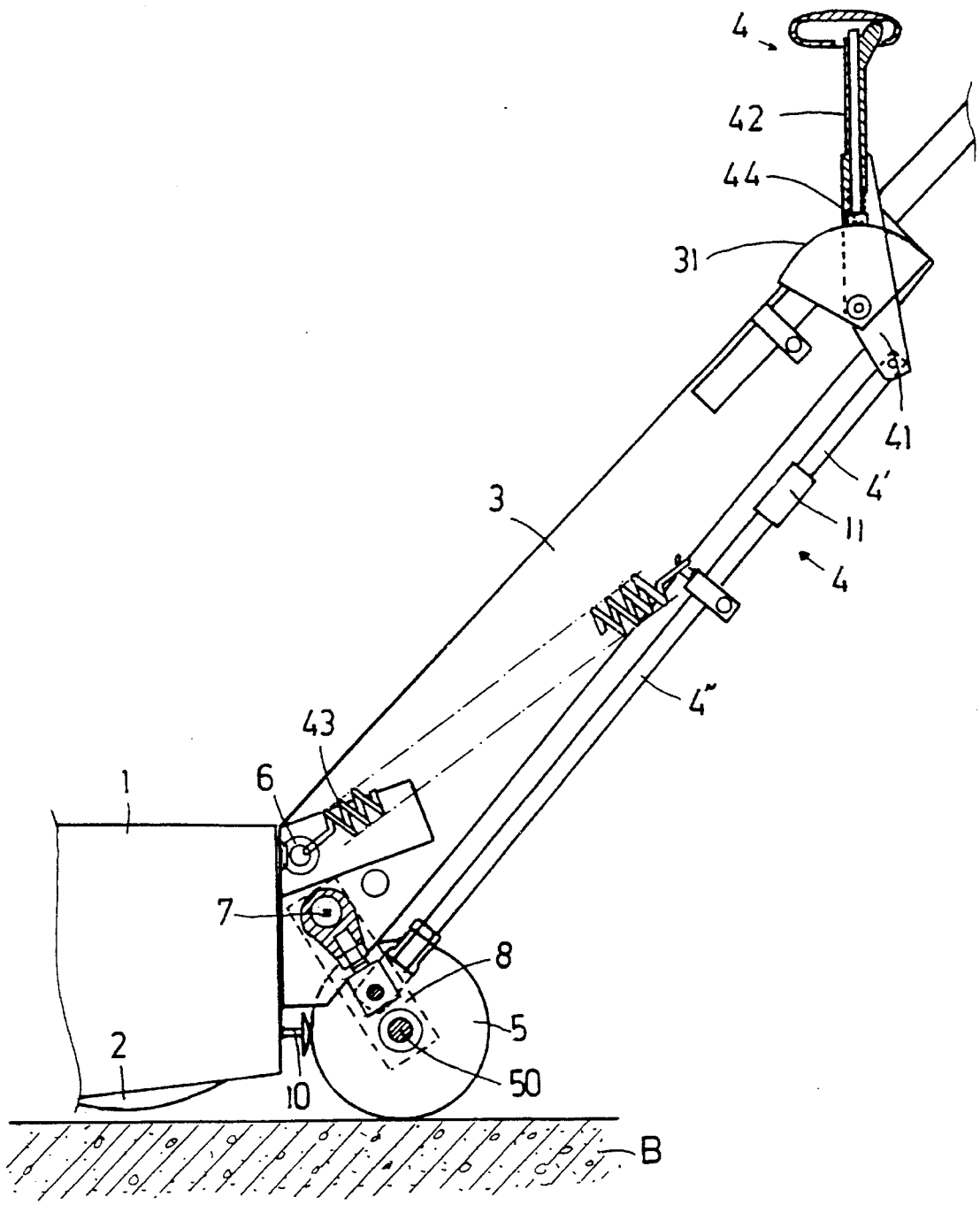
FIG. 1 is a lateral view of the parts of the implement for ground treatment in accordance with one embodiment of this invention.

The implement for ground treatment shown in FIG. 1 comprises at least one blocked running wheel. In actuality this implement has two running wheels which, however, in the lateral view of the drawing are located exactly congruently behind each other.

The implement for ground treatment in accordance with this invention comprises a housing 1 in which a rotor drum 2 is rotatably seated. The rotor drum 2 has freely rotatable beater disks which, in the operating state, beat on the ground B to be treated. A connecting piece 3 is disposed on the housing 1 and ends in a handle, not shown here. In this exemplary embodiment, the connecting piece 3 is not pivotable, but rather is rigidly fixed on the housing. The connecting piece 3 is used for pushing the implement for ground treatment, wherein the person operating the implement determines the advancement manually.

The implement for ground treatment has two support rollers and two running wheels 5. The two support rollers are arranged on the housing and are located on the side opposite the connecting piece 3. They are not height-adjustable and cannot be seen in the drawing figures.

The two running wheels 5 are located on the side of the housing 1 facing the connecting piece 3 and are fastened on the housing 1 or at a lower area of the connecting piece 3. These running wheels 5 are height-adjustable. A height adjustment device required for this is disposed on the connecting piece 3. The height adjustment device comprises a height adjustment rod 4, also called pull rod, which extends approximately parallel in respect to the connecting piece 3. On its lower end, the height adjustment rod 4 is connected to a rocker 8, which is held, pivotably around a horizontal pivot shaft 7, on the connecting piece 3. The running wheels 5 are also disposed on the rocker 8, only one of which is visible in the drawings. If the height adjustment rod 4 is moved upward, the running wheels or their wheel shafts 50 are pivoted around the horizontal pivot shaft 7, so that the relative position of the wheel shaft in respect to the ground B is changed and the running wheels 5 are height-adjusted in this way.

The height adjustment rod 4 is securely fastened at its upper end on a pivot fork 41. This pivot fork is a part of a height adjustment lever 42. A position adjustment means 44 is fastened on this height adjustment lever 42. It preferably comprises a serrated plate which is disposed on the height adjustment lever 42 under spring tension. This position adjustment means 44 is in engagement with a toothed disk 31. In this manner, it is possible to bring the height adjustment lever 42 into different defined positions and maintain it fixed therein, wherein each position corresponds to a defined height setting of the running wheels 5 and thus to a defined working depth.

The height adjustment rod 4 is loaded by a restoring spring 43, one end of which is fastened on the lower area of the connecting piece 3 or, as in this exemplary embodiment, by a strap 6 on the housing 1. This restoring spring 43 maintains the pull rod and, thus the running wheels 5, in a lower end position if the height adjustment lever 42 is not held in another defined, above described position. In this case, the running wheels 5 are in their lowermost position in which they raise the housing 1 high enough so that the rotor drum 2 is at least approximately completely raised off the ground B to be treated. In this position, which is illustrated in FIG. 1, the implement for ground treatment rests on the ground B only on its lowered running wheels 5 and on the support rollers.

In an upper end position, the restoring spring 43 is stretched, the rocker 8 is pivoted around the horizontal pivot shaft 7 by the height adjustment rod 4, so that the running wheels 5 are slightly raised, the housing 1 is lowered and the rotor drum 2 rests on the ground B to be treated.

The implement for ground treatment in accordance with one embodiment of this invention comprises at least one means for blocking at least one of the running wheels 5. In accordance with a preferred embodiment, the blocking means 10 are comprised of a stop disposed on the housing 1 or integrally formed by the housing 1. In this exemplary embodiment, the stop comprises a bolt disposed on the housing 1 in the area of the running wheel 5 visible in the drawings. In its lower end position, the running wheel rests against this blocking means 10. The running wheel 5 is pressed against the blocking means 10 by the force of the restoring spring 43, so that the running wheel 5 is blocked by it. The second, not visible running wheel can be blocked in the same way by another stop.

The implement for ground treatment is secured in the non-operating state with the rotor drum raised by the blockage of at least one of the running wheels. The implement for ground treatment cannot make any uncontrolled movements. The release of the safety is accomplished when the running wheels 5 are slightly raised by the height adjustment device 4 and the rotor drum is therefore lowered into its operating position. The previously blocked running wheel 5 is pivoted away by this action from the blocking means 10 and can now rotate freely and roll along on the ground B. The implement for ground treatment is again ready for use.

Figure 2:
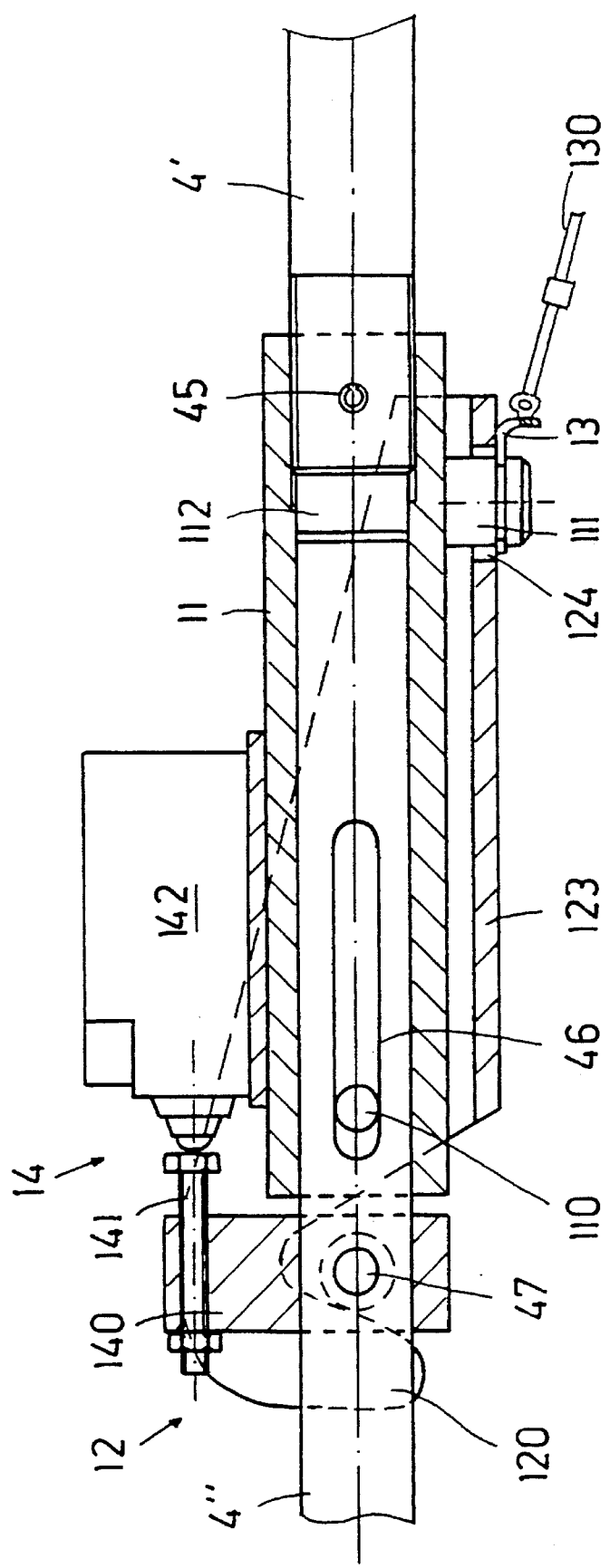
FIG. 2 is a lateral view of a dead-man safety and of the height adjustment rod with elements, shown partially in section, of the invention in accordance with one embodiment.
Figure 3:
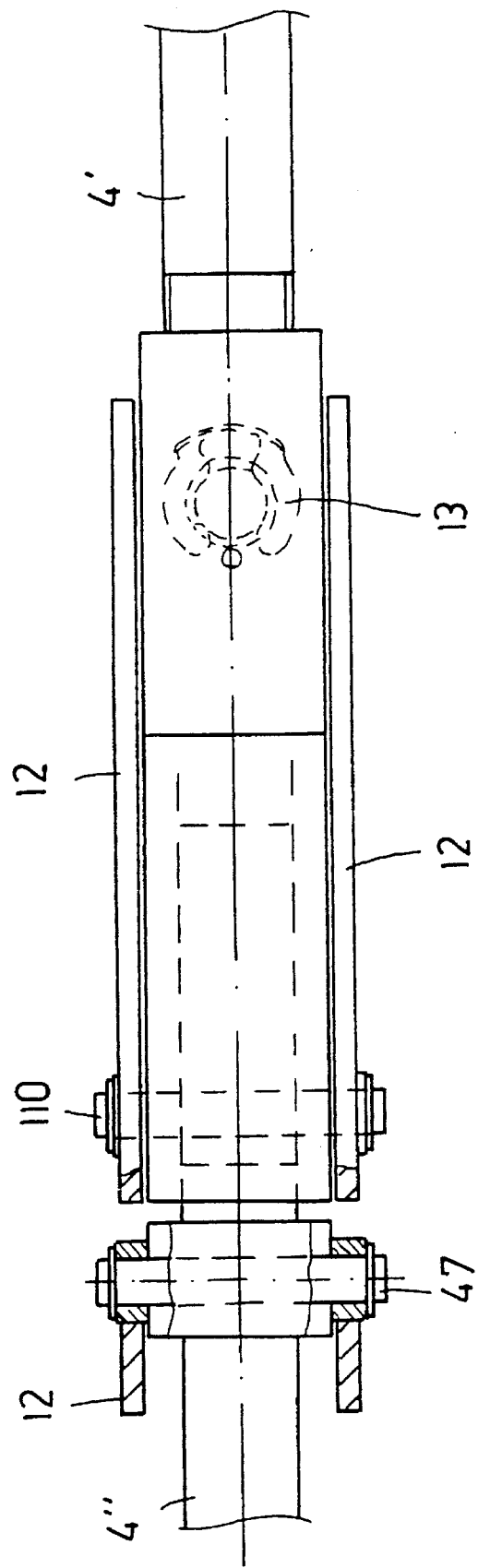
FIG. 3 is a plan view of the dead-man safety shown in FIG. 2.

This ability to lower and simultaneous block the running wheels is not only used for securing the implements in the non-operational state, as described above, but is also used for the dead-man safety. As can be seen in FIGS. 2 and 3, the height adjustment rod 4 comprises two parts. The line of separation of the height adjustment rod 4 is preferably located in its upper area, as shown in FIG. 2.

Thus the height adjustment rod 4 comprises an upper part 4' and a lower part 4". The upper part 4' is coupled to the pivot fork 41. The lower part 4" is connected to the rocker 8, and the tension spring 43 acts on it at the same time. The two adjacent ends of the upper and lower parts are seated in a guide sleeve 11. In this case, the upper part 4' of the height adjustment rod is fixedly connected with the guide sleeve 11 by means of a connecting cotter pin 45. The lower part 4" of the height adjust rod is displaceably seated in the guide sleeve 11 and is guided by it in the process. So that the lower part is only displaceable inside the guide sleeve 11, i.e it cannot be completely separated from it, it forms an elongated hole 46, which extends parallel with the rod axis. As a counterpart, the guide sleeve 11 has a stop in the form of a cam or bolt 110, which engages this elongated hole 46. Thus the lower part 4" of the height adjustment rod is only displaceable in the guide sleeve 11 along the length of the elongated hole 46. A reversal of this arrangement is also possible. That is, the lower part is fixedly connected to the guide sleeve and the upper part is displaceable in respect to these elements. The guide sleeve also essentially is used for the guidance of the displaceable part. Other arrangements of such guidances are possible.

In this exemplary embodiment, the ends of the parts 4', 4" of the height adjustment rod do not directly adjoin each other, but rather are separated from each other by a buffer element 112.

The parts of the height adjustment rod 4 are kept together by an emergency release element 12. In this preferred embodiment, emergency release element 12 comprises two hooks 120, arranged parallel in respect to each other at a distance and connected to each other by a connecting plate 123. Only one of the hooks 120 is visible in FIG. 2, the other one being located congruently on the other side of the height adjustment rod. The connecting plate 123 is located on the side facing away from the bend of the hooks 120. In its rear area remote from the bend of the hooks, the connecting plate 123 has an opening 124. A support bolt 111 projects through this opening 124 and is fixed in place in the guide sleeve 11 and is thus also fixedly connected to the upper part 4' of the height adjustment rod. The support bolt 111 forms a circumferential groove. A support disk 13, open on one side, is disposed in this groove. At least a part of the connecting plate 123 rests on this support disk 13 or, expressed more exactly, at least a portion of the rim surrounding the opening 124. In this way, the rear part of the emergency release element 12 is supported by the support disk 13. The emergency release element 12 is furthermore pivotably held by the bolt 110 of the guide sleeve, as can be seen in FIG. 3.

Thus, the emergency release element 12 partially surrounds the height adjustment rod 4, or the guide sleeve 11. In this case, the two hooks 120 are disposed on oppositely located sides of the height adjustment rod 4. So that the emergency release element 12 connects the lower part 4" of the height adjustment rod with its upper part 4', an arresting bolt 47 is disposed on the lower part 4" and extends through it so that it projects past both sides of the rod. The two hooks 120 of the emergency release element 12 engage each one of the ends of the arresting bolt 47. Thus the front area of the emergency release element 12 is indirectly hooked on the lower part 4" of the height adjustment rod 4. A hook is provided on both sides of the rod in this exemplary embodiment. However, arrangements are also possible wherein a hook is disposed on only one side.

In an emergency, the emergency release element 12 is activated as follows: The support disk 13, open on one side, on which the rear area of the emergency release element 12 rests, acts as a safety element. For this purpose, a ripcord 130 is attached to it and is connected to the operator. If the operator moves away from the implement for ground treatment, he pulls the ripcord 130 along and the support disk 13 is pulled out of the groove. The emergency release element 12 drops, because it is no longer supported by the safety element 13. In the process, the emergency release element 12 pivots around the bolt 110 of the guide sleeve 11 and the hooks are released from the arresting bolt 47. The connection between the lower and the upper part of the height adjustment rod 4 is released. Because of its own weight and the pulling force of the spring 43, the lower part 4" guided by the guide sleeve 11, drops and the running wheels 5 are automatically lowered. At least one running wheel rests against the blocking means 10 and is blocked. The rotor drum 2 now revolves freely because it has been raised from the ground B. The implement for ground treatment cannot make any uncontrolled movements and, in this way, is secured.

In addition, an emergency shutoff for the drive motor of the rotor drum 2 is provided in this exemplary embodiment. The emergency shutoff element 14 is operatively connected with the emergency release element 12. The emergency shutoff element 14 comprises an adjusting screw 141 which has been screwed into a rider 140 on the lower part 4" of the height adjustment rod 4. The rider is preferably fastened by the already described arresting bolt 47, which extends through it. A contact switch 142 is disposed on the guide sleeve 11, or possibly on the upper part 4' of the height adjustment rod 4 and is operatively connected to the drive motor. When the parts of the height adjustment rod 4 are connected to each other by the hooks 120, the adjusting screw 141 actuates the contact switch 142 so that it is made active. In this way, the drive motor is capable of operating. If the emergency release element 12 is actuated, i.e. the running wheels are lowered and blocked, the adjusting screw 141 and the contact switch 142 are also separated from each other and the supply line, for example, is interrupted. The drive motor is turned off as a result of this. The arrangement of the contact switch and the adjusting screw can also be reversed so that the contact switch is disposed on the guide sleeve.

If the implement for ground treatment is to be put back into operation following an emergency shutoff made in this way, this can be accomplished in a simple manner. It is merely necessary to hook up the hooks of the emergency release element 12 again and to arrange the support disk 13. To accomplish this, the height adjustment rod 42 is completely retracted into the braking position. Because of this, the two parts 4', 4" of the height adjustment rod are pushed together so that the emergency release element 12 can be pivoted inward and secured by means of the support disk. The contact for the drive motor is also automatically restored by this and the implement for ground treatment is again ready for use.

What is claimed is:

1. In a manually displaceable implement for ground treatment, comprising a housing (1), a motor-driven rotor drum (2) rotatably seated in the housing (1), a connecting piece (3), and running wheels (5) which are height-adjustable by means of a spring-loaded (43) height adjustment rod (4), said running wheels (5) being movable into a lower end position which is almost free of spring tension and the rotor drum (2) being substantially completely lifted off the ground (B) to be treated, the improvement comprising: the height adjustment rod (4) being divided into two parts, a lower, spring-loaded part (4") of the height adjustment rod (4) being releasably connected by an emergency release element (12) to an upper part (4') of the height adjustment rod (4), whereby the connection is automatically released in an emergency, and blocking means (10) for blocking at least one lowered running wheel (5) disposed on the housing (1), whereby when the connection is released, the running wheels (5) are in the lower end position and at least one of the running wheels (5) is blocked.

2. In an implement for ground treatment in accordance with claim 1, wherein the two parts (4', 4") of the height adjustment rod (4) are seated in a guide sleeve (11) in an area of their connection, whereby in a disconnected state, a first part is guidedly displaceable in the guide sleeve (11) and the second part is fixedly connected to the guide sleeve (11).

3. In an implement for ground treatment in accordance with claim 2, wherein the displaceable part of the height adjustment rod (4) forms an elongated hole (46), said elongated hole (46) extending parallel in respect to the rod axis and engaged by a bolt (110) of the guide sleeve (11).

4. In an implement for ground treatment in accordance with claim 3, wherein the first part corresponds to the lower part (4") and the second part corresponds to the upper part (4').

5. In an implement for ground treatment in accordance with claim 4, wherein the emergency release element (12) comprises a hook which, in a connected state, is hooked on an arresting bolt (47) disposed on a first part of the height adjustment rod (4) and is releasably connected to the second part of the height adjustment rod (4) by a safety element (13), which is connected to a ripcord (130).

6. In an implement for ground treatment in accordance with claim 5, wherein the safety element comprises a support disk (13) open on one side, on which the hook-shaped emergency release element (12) rests in the connected state.

7. In an implement for ground treatment in accordance with claim 6, wherein the emergency release element (12) comprises two hooks (120) arranged parallel in respect to each other at a distance from each other and connected by a connecting plate (123), the hooks (120) arranged on oppositely located sides of the height adjustment rod (4) and the arresting bolt (47) penetrating through the height adjustment rod (4) on both sides.

8. In an implement for ground treatment in accordance with claim 7, wherein the arresting bolt (47) is disposed on the lower part (4") of the height adjustment rod (4).

9. In an implement for ground treatment in accordance with claim 8, wherein an emergency shutoff element (14) for the drive motor is operatively connected to the emergency release element (12).

10. In an implement for ground treatment in accordance with claim 9, wherein the emergency shutoff element (14) for the drive motor comprises an adjusting screw (141) and a contact switch (142), each attached to a different part of the height adjustment rod (4), whereby they are only in contact with each other in the connected state.

11. In an implement for ground treatment in accordance with claim 2, wherein the first part corresponds to the lower part (4") and the second part corresponds to the upper part (4').

12. In an implement for ground treatment in accordance with claim 11, wherein the emergency release element (12) comprises a hook which, in a connected state, is hooked on an arresting bolt (47) disposed on a first part of the height adjustment rod (4) and is releasably connected to the second part of the height adjustment rod (4) by a safety element (13), which is connected to a ripcord (130).

13. In an implement for ground treatment in accordance with claim 12, wherein the safety element comprises a support disk (13) open on one side, on which the hook-shaped emergency release element (12) rests in the connected state.

14. In an implement for ground treatment in accordance with claim 12, wherein the emergency release element (12) comprises two hooks (120) arranged parallel in respect to each other at a distance from each other and connected by a connecting plate (123), the hooks (120) arranged on oppositely located sides of the height adjustment rod (4) and the arresting bolt (47) penetrating through the height adjustment rod (4) on both sides.

15. In an implement for ground treatment in accordance with claim 12, wherein the arresting bolt (47) is disposed on the lower part (4") of the height adjustment rod (4).

16. In an implement for ground treatment in accordance with claim 14, wherein the arresting bolt (47) is disposed on the lower part (4") of the height adjustment rod (4).

17. In an implement for ground treatment in accordance with claim 1, wherein an emergency shutoff element (14) for the drive motor is operatively connected to the emergency release element (12).

18. In an implement for ground treatment in accordance with claim 17, wherein the emergency shutoff element (14) for the drive motor comprises an adjusting screw (141) and a contact switch (142), each attached to a different part of the height adjustment rod (4), whereby they are only in contact with each other in the connected state.

\* \* \* \* \*